Nov. 28, 1933.  R. R. WORRALL  1,937,303
CONVEYER SYSTEM
Filed June 23, 1930  3 Sheets-Sheet 1
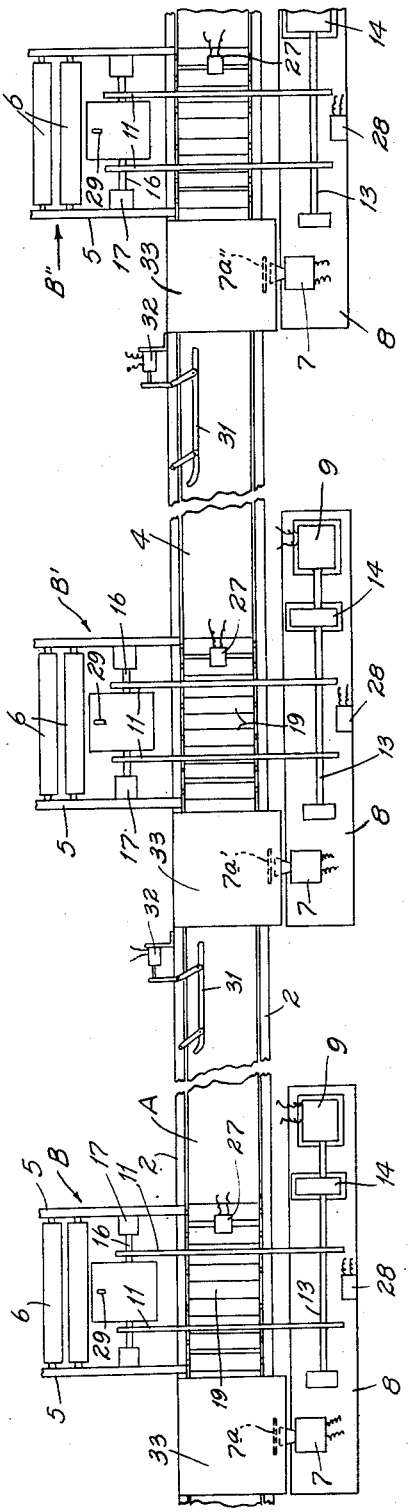
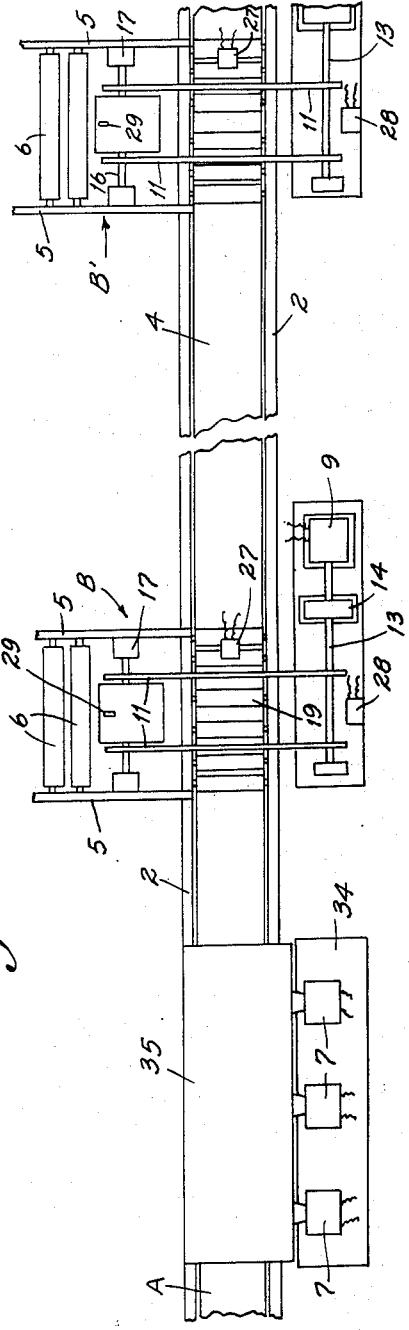
INVENTOR:
Roy R. Worrall
by Carr Kerr & Gravely
HIS ATTORNEYS.

Nov. 28, 1933.   R. R. WORRALL   1,937,303
CONVEYER SYSTEM
Filed June 23, 1930   3 Sheets-Sheet 2

INVENTOR:
Roy R. Worrall,
by Van Hau & Gravely,
HIS ATTORNEYS.

Nov. 28, 1933.    R. R. WORRALL    1,937,303
CONVEYER SYSTEM
Filed June 23, 1930    3 Sheets-Sheet 3

INVENTOR:
Roy R. Worrall,
by Can Hen Gravely,
HIS ATTORNEYS.

Patented Nov. 28, 1933

1,937,303

UNITED STATES PATENT OFFICE 1,937,303

CONVEYER SYSTEM

Roy R. Worrall, Webster Groves, Mo., assignor to Alvey Conveyor Manufacturing Co., St. Louis, Mo., a corporation of Missouri Application June 23, 1930. Serial No. 462,958

6 Claims. (Cl. 198—38)

My invention relates to conveyer systems of the type comprising a main line with branch lines communicating therewith, wherein cases on the main line will be selectively delivered to the proper branch line. The principal object of this invention is to provide means for automatically shifting articles on the main line onto the branch lines selectively.

My invention consists principally in means under the control of a photo-electric cell responsive to articles on a conveyer for selectively delivering such articles therefrom. It also consists in the parts, combinations and arrangements of parts hereinafter described and claimed.

Figure 2:
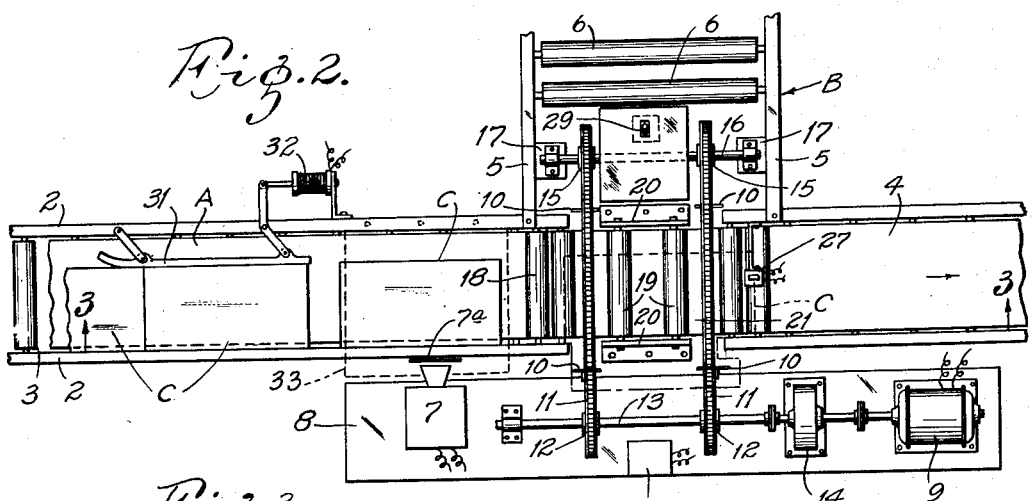
Figure 3:
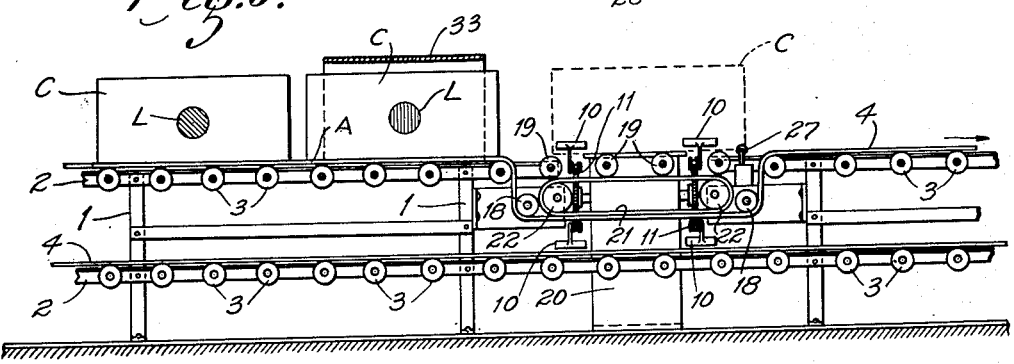
Figure 4:
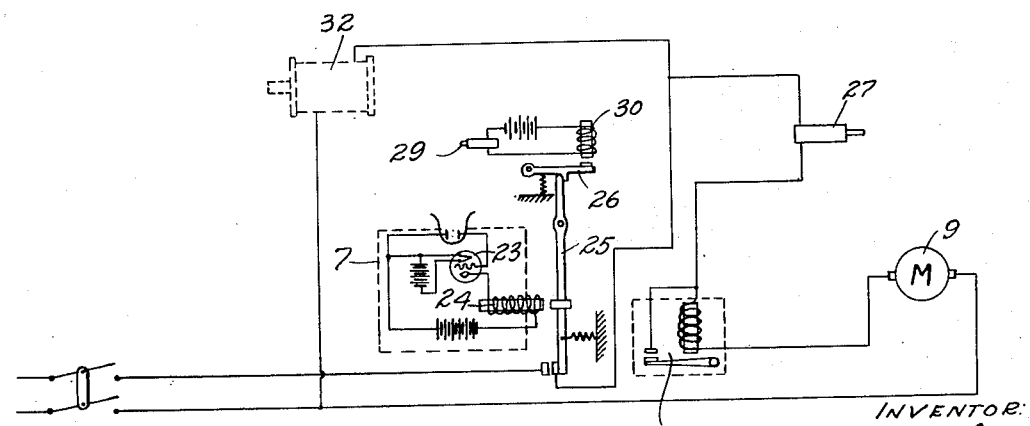

In the accompanying drawings, which form part of this specification and wherein like symbols refer to like parts wherever they occur, Fig. 1 is a diagrammatic plan view of a conveyer system showing a main line with branch lines leading therefrom and equipped with my invention, Fig. 2 is a detail plan view of one of the shifting devices provided at the junction of the main line and each branch line, Fig. 3 is a view along the line 3—3 of Fig. 2, Fig. 4 is a diagrammatic view of the wiring system of a shifting device, Fig. 5 is a modified form of my system, Fig. 6 is a plan view of a modified form of a shifting device, Fig. 7 is a vertical cross section along the line 7—7 of Fig. 6, Fig. 8 is an enlarged detail view, with parts broken away, of an operator which is shown diagrammatically in Fig. 6, and Fig. 9 is a diagrammatic view of the wiring system for the modified form of shifting device.

In the construction illustrated, a main line A comprises upright members 1, side members 2 supported thereby, suitable rollers 3 mounted on said side members and a continuous belt 4 riding on said rollers and driven by any suitable means (not shown).

Branch lines B, B' and B", all of which are of ordinary gravity type construction, extend preferably at right angles to the main line, and each comprises side frames 5, with suitable rollers 6 mounted thereon. While I have shown only three branch lines, it is obvious that any number may be used without departing from my invention.

The shifting or deflecting devices at each of the branch lines are all similar in construction and each one is controlled by a photo-electric cell 7, provided with a color filter 7a, which is located alongside the main line a suitable distance forwardly from the junction of the main line and a branch line. In order to obtain selectivity, each of the cells is adjusted so as to be energized by a definite amount of light corresponding to a certain amount of light reflected by a particular color. By providing the photo-electric cells with different color filters 7a, 7a' and 7a" at the various branch lines it is possible to predetermine the path which any case will travel. I have found that by pasting a label of a particular color on the side of a case on the main line so that said label will pass within close range of the photo-electric cells operating the various shifting mechanisms, said case will be deflected at the branch line whose color filter and cell are responsive to that particular color. I have also found that instead of using color filters, the same may be omitted, and the photo-electric cells may be arranged so that the cell at the first branch line necessarily requires the greatest amount of light to create the desired impulse, the next one a less intense light and so on, the last cell reacting to a small quantity of light.

The photo-electric cell 7 in each case is mounted to the side of the conveyer A on a suitable base 8 and is located so that the lens portion of said cell is in a position to receive light rays reflected through the color filter from the side of a case riding on the main line. Each color filter is of such a type that it will absorb those colors which are not desired at the particular cell with which it is associated. For example, assuming that the first branch line is to deflect an article with a red label thereon, the color filter at said branch line should be of a type that it will absorb all colors but red, and allow red rays to pass therethrough which will energize the cell at said branch line and cause the shifting mechanism to operate.

Each of said cells is connected in a suitable circuit (hereinafter described) which controls an electric motor 9 which in turn is operatively connected to suitable shifting means for delivering the cases from the main line onto any of the branch lines.

Any suitable means may be used for shifting the articles; one suitable form comprises a pair of shoving arms 10 which are mounted opposite each other on sprocket chains 11 traveling crosswise the main line, so as to shove an article onto the branch line. Carrying the sprocket chains 11 are the sprocket wheels 12, located adjacent to each branch line, and mounted on a shaft 13, which runs longitudinally of the main line, and is suitably supported on the base 8 which supports the photo-electric cell. Also mounted on said base 8 is the electric motor 9 which drives the shaft 13, through a suitable gear speed reducer 14. The sprocket wheels 15, carrying the other end of the chains are mounted on a countershaft 16 which extends across the branch line, and is suitably supported in bearings mounted on brackets 17, secured to the side frames 5 of said branch line.

In order to provide for clearance and proper operation of the sprocket chains, the belt 4 of the main line A is depressed adjacent to the branch line entrance by means of idler pulleys 18, which are suitably mounted on the framework of the conveyer, and rollers 19 extend across the main line and are suitably supported by upright members 20, so that the sprocket chains pass between said rollers. In order to insure continuous movement of a case riding over the rollers 19, an auxiliary belt 21 suitably mounted on pulleys 22 is driven by frictional contact with the continuous belt 9, and engages the bottom of the rollers 19 for rotating them.

For the purpose of clarifying the description, the operation of the conveyer system may be set forth as follows: Assuming a case is to be deflected to the branch line whose photo-electric cell is energized by a red light, a red label is pasted upon the side of said case. Said case C arrives at the point, where the colored label L pasted on the side of the case is adjacent to the lens portion of the photo-electric cell responsive to a red light, and said cell is energized. The impulse of the photo-electric cell is then amplified by means of a vacuum tube 23 and the resultant current energizes a solenoid 24. The magnetic action of the solenoid 24 rotates a pivoted lever 25, until one end of said lever closes a gap in the circuit controlling the motor operatively connected to the deflecting means, and said lever is held in such a postition by a catch lever 26. This action, however, does not start the motor, as a limit switch 27 (normally opened) is inserted in the circuit in series, said switch being located in such a position that it will be closed by having the bottom of a case engage its actuating lever when the case arrives at a point adjacent to the branch line and in a position to be deflected thereon. Upon closing said limit switch 27, a magnetic switch 28 is energized which allows current to flow through the motor and continues to do so even after limit switch 27 is opened when the case ceases to engage said limit switch's actuating lever. The case upon energizing the motor causes itself to be shoved by the pair of arms extending from the sprocket chains until said case is suitably started on the branch line whereupon the bottom of said case engages the actuating lever of a second limit switch 29, which energizes a coil 30 causing the catch lever to release the relay lever and the armature circuit is thereby opened and the motor ceases to run.

In order to prevent clogging of the cases at the junction of the main line and branch lines, when a case is being shifted to the branch line, a blocking device 31 is mounted on the side of the main line a suitable distance from the junction of the two lines and is operated by a solenoid 32 which is energized at the same time the light impulse acts on the cell, by the action of the relay lever closing the solenoid circuit. Also, the shoving arms 10 provided on the sprocket chains are so located that after one pair deflects a case to the branch line, the other is seated in a proper position for engaging a following case.

It is obvious that a different wiring system could be used without departing from my invention. For instance, certain standard equipment may be used for connecting the various photoelectric cells to the shifting motors, and in such cases certain changes in the wiring system may be necessary. It is also obvious that the motor circuit in each case may be provided with any accessory equipment, such as a dynamic brake relay and other suitable devices to insure proper action of the device. Also, instead of the above described deflecting means, a deflecting arm or the like may be operatively connected to the motor, for shifting the articles from the main line.

Preferably in order to prevent extraneous light from acting on the photo-electric cells and insuring proper action thereof, a suitable hood 33 is provided on the main line forwardly from the junction of said line with each branch line, and said hood is provided with an opening through which the lens portion of the cell, associated with said branch line, extends. Suitable means may also be provided for throwing a constant and definite amount of light on the side of the cases as they pass under said hood.

In the modification shown in Fig. 5 all of the cells 7 are mounted on a single base 34 located a slight distance rearwardly from the feeding point of the main line, and they are suitably shielded from undesirable light by a large hood 35 which also covers the main line at that point and forms a darkened tunnel through which the cases travel before reaching any of the branch lines. The cells in this instance, are connected with the respective deflecting mechanisms, at the various branch lines, in the same manner as described in connection with the preferred form. In the modified form, however, the blocking devices are omitted and cases must therefore be placed on the main line at regular intervals in order to insure proper selective operation of the system.

In the modified form of shifting device shown on sheet 3 of the drawings, the cases are shifted from the main line to a branch line by means of a pushing mechanism comprising a pair of pusher rods 36 provided with a cross member 37 which is located adjacent to the branch line and in a position to push articles thereon. Said pusher rods 36 are slidably mounted on the top portions of vertical brackets 38 extending from horizontal members 39 secured to the conveyer framework supporting the main line. Extending from said cross member 37, at its forward end with reference to the main line, is a blocking arm 37a which prevents articles from clogging the junction of the main line and branch line when the shifting mechanism is in operation.

The pushing mechanism is operated by an arm 40, located between the two pusher rods 36, said arm being hinged to the cross member 37 and to an arm 41 of a crank 42 which is pivoted on a bracket 43 secured to the conveyer framework. A second arm 44 extending from the crank is secured to a thrusting device 45 of standard design and commonly known commercially as an operator. Said operator in general, comprises a cylindrical casing 46 and a piston 47 therein which is provided with a centrifugal impeller pump 48 that is driven by a motor 49 mounted in the top portion of said casing. By means of the centrifugal impeller 48, oil in the casing may be forced to either the top or bottom portion of the cylinder with a resultant raising or lowering of the piston and the thrust obtained thereby is transmitted through two piston rods 48a to a connecting member 49a which is attached to said crank arm 44.

When this form of shifting means is used, it is not necessary to use two limit switches for controlling the shifting device, as the colored labels used for influencing the photo-electric cell associated with the shifting means, are pasted on the side of a case near the rear end thereof, so that when a case is in a proper position for deflection to the branch line, the reaction of said cell immediately causes the pushing mechanism to operate. After a case has been shoved on the branch line and the pusher mechanism has reached its forward stroke, the actuating arm of a limit switch 29a (normally closed) is engaged by the crank arm 44. As said switch 29a is connected in series with the armature circuit of the operator motor, said motor is immediately stopped and the pushing mechanism is brought back to its normal position by gravity or any suitable means such as a spring 50.

While I have illustrated color filters in describing my invention, the same may be omitted and the cells may be arranged so as to respond to varying degrees of light intensity, as previously stated, and thus produce a selective system. Also, selectivity of the system, may be made dependent on the size of the cases, as the photo-electric cells operating the various shifting mechanisms may be adjusted so as to respond when a constant light continually flooding them is cut off. Consequently, by arranging the photo-electric cells at different heights, and by using cases of different heights, the same may be selectively delivered to predetermined branch lines.

What I claim is:

1. A conveying system comprising a main line, a branch line leading therefrom, means for shifting an article from said main line to said branch line, a motor operatively connected to said shifting means, means for blocking the passage of articles on the main line before reaching the junction of the main line and branch line, and means for controlling both said shifting means and said blocking means comprising a photo-electric cell operatively located with relation to the main line so as to be responsive to an article thereon.

2. The combination of a conveyer, sprocket chains traveling across said conveyer, arms extending from said sprocket chains for engaging an article riding on said conveyer, a motor operatively connected to said sprocket chains and means for controlling said motor comprising a photo-electric device operatively located with relation to the conveyer so as to be responsive to an article thereon.

3. A conveying system comprising a main line, a branch line leading therefrom, means for shifting an article from said main line to said branch line, means controlling said shifting means comprising a photo-electric device for selecting said shifting means operatively located with reference to the main line so as to be within the range of influence of an article thereon, a limit switch in a position to be actuated by an article on said main line for starting said shifting means and a second limit switch located on said branch line in a position to be actuated by an article shifting thereon for stopping said shifting means.

4. The combination of a conveyer, rods slidably mounted on the side of said conveyer provided with a cross member secured to each forward end of said rods for engaging and shoving an article off of said conveyer, a crank pivoted on a bracket extending from said conveyer, a connecting member hinged to said cross member and to one arm of said crank, means for rotating said crank and means for controlling said rotating means comprising a photo-electric cell located with relation to the conveyer so as to be within the range of influence of an article thereon.

5. The combination of a conveyer, rods slidably mounted on the side of said conveyer provided with a cross member secured to each forward end of said rods for engaging and pushing an article off of said conveyer, a crank pivoted on a bracket extending from said conveyer, a connecting member hinged to said cross member and to one arm of said crank, an operator operatively connected to the other arm of said crank, and means for controlling said operator comprising a photo-electric cell located with relation to the conveyer so as to be responsive to an article thereon.

6. A conveying system comprising a main line, a branch line leading therefrom, means for pushing an article from said main line to said branch line, means controlling said pushing means comprising a photo-electric device for selecting and starting said shifting means operatively located with reference to the main line so as to be within the range of influence of an article thereon, and a limit switch in a position to be actuated by said pushing means for stopping the same.

ROY R. WORRALL.